United States Patent [19]

Duclos

[11] Patent Number: 5,720,475
[45] Date of Patent: Feb. 24, 1998

[54] TORSION DAMPING DEVICE, ESPECIALLY FOR A MOTOR VEHICLE

[75] Inventor: Didier Duclos, Ozoir la Ferriere, France

[73] Assignee: Valeo, Cedex, France

[21] Appl. No.: 525,667

[22] PCT Filed: Jan. 26, 1995

[86] PCT No.: PCT/FR95/00081

§ 371 Date: Dec. 6, 1995

§ 102(e) Date: Dec. 6, 1995

[87] PCT Pub. No.: WO95/20728

PCT Pub. Date: Aug. 3, 1995

[30] Foreign Application Priority Data

Jan. 26, 1994 [FR] France ..................... 94 00839

[51] Int. Cl.[6] ........................................ F16F 5/12
[52] U.S. Cl. ................ 267/273; 192/201; 192/213.31; 464/68
[58] Field of Search ............... 267/273; 464/24, 464/67, 66, 68; 74/574; 192/206, 213.31, 70.17

[56] References Cited

U.S. PATENT DOCUMENTS

| 4,767,380 | 8/1988 | Chasseguet et al. ........... 74/574 X |
| 5,245,889 | 9/1993 | Kohno et al. ................ 192/201 X |
| 5,293,978 | 3/1994 | Reik et al. .................. 74/574 X |

FOREIGN PATENT DOCUMENTS

| 2553848 | 4/1985 | France . |
| 2601103 | 1/1988 | France . |
| 3418671 | 5/1985 | Germany . |
| 3627784 | 7/1987 | Germany . |
| 6102920 | 1/1986 | Japan . |
| 61-2920 | 5/1986 | Japan . |
| 4316745 | 9/1992 | Japan . |
| 1747190 | 7/1992 | U.S.S.R. . |

OTHER PUBLICATIONS

Patent Abstracts of Japan vol. 10, No. 146 (M–482) (2203) May 28, 1986.

Patent Abstracts of Japan vol. 17, No. (M–1385) Mar. 22, 1993.

*Primary Examiner*—Peter M. Poon
*Attorney, Agent, or Firm*—Longacre & White

[57] ABSTRACT

A torsion damping device having comprising two coaxial parts (11A, 11B), one primary, one secondary, which are mounted for rotation of one with respect to the other against the action of circumferentially acting resilient member (12) and friction member (13). According to the invention, the friction member (13) has at least one thin plate element (50) which, being carried by one of the coaxial parts (11A, 11B), extends obliquely with respect to the axis (A) of the assembly and bears through its edge (51) against the other one of the coaxial parts (11A, 11B), and which is subjected, on its surface (52) that faces away from the axis (A) of the assembly, to the action of a modulating member (53) which is responsive to centrifugal force, for example a spring of the coil spring type loaded with weights.

13 Claims, 1 Drawing Sheet

TORSION DAMPING DEVICE, ESPECIALLY FOR A MOTOR VEHICLE

BACKGROUND OF THE INVENTION

1. Field of the Invention

This invention relates to torsion damping devices, and especially those with which motor vehicles are equipped for damping vibrations between the output shaft of the engine and the input shaft of the gearbox.

2. Description of the Prior Art

These torsion damping devices are fitted for example to the clutch, and/or to the flywheel when the latter consists of a divided flywheel which is commonly called a double damped flywheel.

In general terms, they comprise two coaxial parts, one primary, one secondary, which are mounted for rotation of one with respect to the other against the action of circumferentially acting resilient means and friction means, and which constitute masses in the case of a double damped flywheel.

The phase of operation that occurs on starting and stopping of the engine is critical, because, since the frequency of the vibrations to be absorbed is varying, either at increasing frequency in the case of starting or at decreasing frequency in the case of stopping, they inevitably pass through the natural resonance frequency of the vehicle if, as is usual, the latter lies below the minimum range that is possible during movement.

If rapid suppression of this resonant frequency is not achieved, unacceptable shocks can result.

In order to overcome this difficulty, it has been proposed in the document FR-A-2 553 848 to lock one of the two coaxial parts positively and temporarily on to the other, by means of an interposed member which acts, for example, in the manner of a bolt or wedge, and which is responsive to centrifugal force.

Such positive locking is hard to control, and this therefore leads inevitably to a substantial complication of the assembly.

In addition, the components employed run the risk of jamming.

An object of the invention is to provide a torsion damping device which does not have these drawbacks, and which also has other advantages.

SUMMARY OF THE INVENTION

This torsion damping device, which is as suitable for use with a clutch as with a double damped flywheel, is of the kind comprising two coaxial parts, one primary, one secondary, which are mounted for rotation of one with respect to the other against the action of circumferentially acting resilient means and friction means, and is in general terms characterized in that the friction means comprise at least one thin plate element which, being carried by one of the coaxial parts, extends obliquely with respect to the axis of the assembly and bears through its edge against the other one of the coaxial parts, and which is subjected, on its surface that faces away from the axis of the assembly, to the action of a modulating member which is responsive to centrifugal force.

The locking action adapted to take place on starting and stopping is thus advantageously obtained not in a positive manner, but by friction.

Consequently there is no risk of any component whatsoever becoming jammed.

The assembly has the additional advantage that its construction is particularly simple.

For example, the modulating member responsive to centrifugal force can very simply be a spring, which may optionally be loaded with at least one weight, and which extends in an annular manner around the axis of the assembly, being elastically deformable in the radial direction.

Preferably, the thin plate element which is employed extends, itself, in a continuous circle around the axis of the assembly, in the manner of a ring.

Thus, in the case where one of the two coaxial parts defines a chamber in which the resilient means are disposed, while the other one includes a damper plate which extends radially into the said chamber for engagement with the said resilient means, the said thin plate element has the advantage that it can be employed beneficially to close off the interior of the said chamber sealingly at the level of the plate element.

In this way, additional use is advantageously made of the said thin plate element.

In that case there is such a thin plate element on at least one side of the damper plate, and preferably on each side of the latter.

The features and advantages of the invention will appear more clearly from the description which follows by way of example, with reference to the attached diagrammatic drawings, in which:

DETAILED DESCRIPTION OF THE PREFERRED EMBODIMENT

Figure 1:
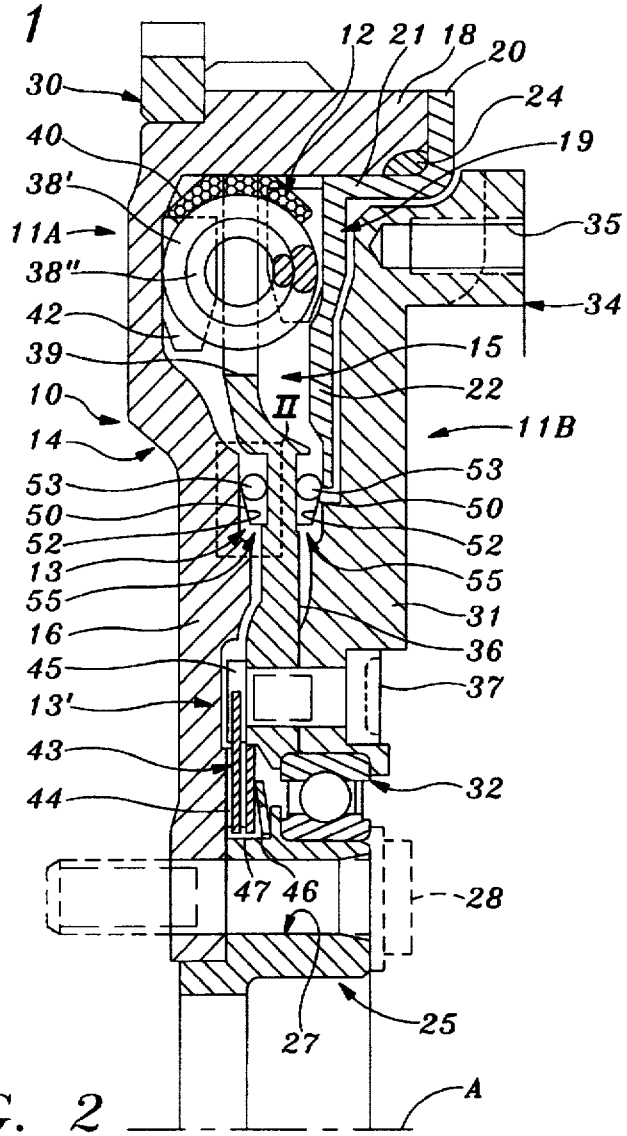
Figure 2:
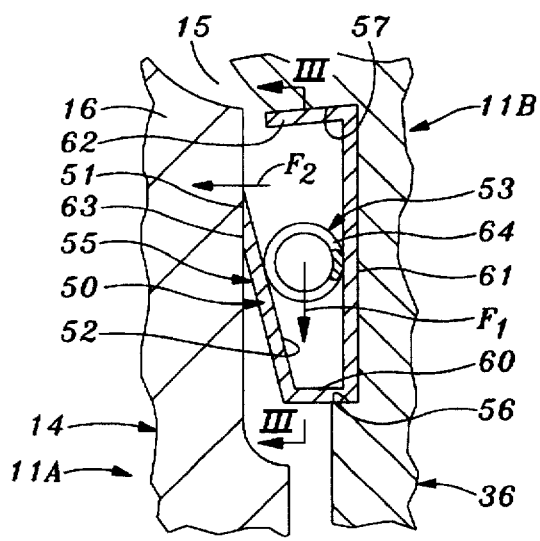
Figure 3:
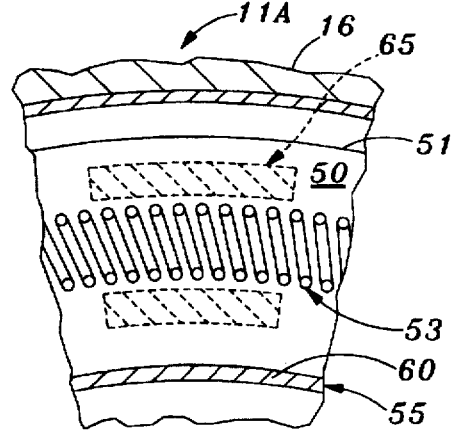

FIG. 1 is a view in axial cross section of part of a torsion damping device in accordance with the invention;

FIG. 2 repeats on a larger scale the detail of FIG. 1 indicated by a box II in the said FIG. 1;

FIG. 3, which is on the same scale as FIG. 2, is a view of the torsion damping device according to the invention, in transverse cross section taken on the line III—III in FIG. 2.

The drawings show, by way of example, the application of the invention to a double damped flywheel 10 for a motor vehicle.

This double damped flywheel 10, which by itself constitutes a torsion damping device, comprises two coaxial parts 11A, 11B, one primary, the other secondary, which constitute masses and which are mounted for rotation of one with respect to the other against the action of circumferentially acting resilient means 12 and friction means 13, which will be described in more detail later herein.

The primary coaxial part 11A comprises in this example a housing 14 which defines an annular chamber 15, in which the resilient means 12 are located.

This chamber is filled, at least partly, with a pasty or viscous agent such as grease, for lubrication of the resilient means 12.

In this example, the housing 14 comprises, firstly, a plate 16 which extends transversely and which has a flange 18 at its outer periphery and parallel to the axis A of the assembly, and secondly, a cover plate 19 which, being fixed to the housing 14 and attached on the flange 18 at the end of the latter, for example by screws not shown, extends transversely and parallel to the plate 16, over only part of the radial depth of the latter.

In this example the cover plate 19 includes, in succession, a transverse portion 20 through which it is applied to the inner surface of the said flange 18, and a transverse portion 22 which extends towards the axis A of the assembly.

A sealing element 24 is arranged between the cover plate 19 and the flange 18, in the angle defined between the transverse portion 20 and the axial portion 21 of the cover plate 19.

The sealed housing 14 is fixed in rotation at its inner periphery to a hub 25 for rotation with the hub, which in this example is a separate component from its plate 16.

In order to secure the assembly to a driving shaft, which is not shown but which is the output shaft, or crankshaft, of the engine, the hub 25 and the plate 16 are provided with through holes, arranged from place to place on a pitch circle in correspondence with each other, for receiving studs 28 which extend through them.

The housing 14 carries a starter crown 30 at its outer periphery, externally of the junction between the plate 16 and its flange 18.

The secondary coaxial part 11B likewise includes, parallel to the plate 16 of the primary coaxial part 11A but spaced away from the latter, a plate 31, and the latter is adapted to be the reaction plate of a friction clutch, not shown, in accordance with known arrangements of the type which is described for example in the document FR-A-2 553 848 (U.S. Pat. No. 4,638,684).

The plate 31 accordingly has a friction surface for engagement with the friction disc of the friction clutch. This friction surface faces away from the plate 16.

The plate 31 is centred through its inner periphery on the hub 25 of the primary coaxial part 11A, in the present case through an interposed ball bearing 32.

In a modification, this ball bearing 32 may for example be replaced by a plain bearing.

The plate 31 has at its outer periphery a flange 34, which, like the flange 18 of the plate 16 of the primary coaxial part 11A, extends parallel to the axis A of the assembly, and which in this example has threaded holes 35 arranged from place to place on a pitch circle, for fastening of the associated clutch mechanism, and more precisely of the cover plate which is part of the latter.

The secondary coaxial part 11B also includes a damper plate 36 which extends radially within the chamber 15, between the plates 16 and 31, for operative engagement with the resilient means 12.

In this example the damper plate 36 is fixed by means of studs 37 to the plate 31 at the inner periphery of the latter, and serves for the axial location of the outer ring of the ball bearing 32.

In the present case the resilient means 12 consist of resilient members 38 which are located from place to place along a pitch circle around the axis A of the assembly.

Each of these comprises, in this example, firstly a first spring 38' of the coil spring type, and secondly, a second spring 38", again of the coil spring type and arranged coaxially with the spring 38'.

For engagement with the resilient members 38, the damper plate 36 has, arranged from place to place along a pitch circle at its outer periphery, openings 39, in each of which a said resilient member 38 is disposed circumferentially, with or without a clearance.

In the present case these openings 39 are in the form of slots which are open radially at the outer periphery of the damper plate 36, while in addition, there is provided between each resilient member 38 and the flange 18 of the housing 14 a pad 40, or in a modification an annular chute-shaped piece, for preventing rubbing of a resilient member 38 on the flange 18.

Thus the chamber 15 is mostly bounded by the coaxial mass 11A, and the damper plate 36 has, at its outer periphery, arms which are defined by the openings 39 and which penetrate into the said chamber 15.

For engagement with the resilient means 12, the housing 14 of the primary coaxial part 11A carries pad elements 42 which project axially into the chamber 15 and with which the resilient members 38 are able to cooperate through their circumferential ends, these pad elements being disposed from place to place around a circle, both on the plate 16 and on the cover plate 19, with those on the plate 16 corresponding to those on the cover plate 19.

The friction means 13' in this example comprise a disc 43 which is provided with a friction liner 44 on each of its surfaces and extends annularly around the axis A of the assembly, close to the hub 25 and in contact with the plate 16, and which, being mounted at its outer periphery on the damper plate 36 for rotation with it, is biassed by an axially acting resilient ring 46, which in this example is of generally frusto-conical form and which holds the disc in permanent engagement against the plate 16 through a spacer ring 47, which is mounted on the hub 25 for rotation with the latter.

More precisely, the ring 46 bears on a shoulder of the hub 25. The damper plate 36 has at its outer periphery an extension which is provided with notches into which rivets 45, fixed to the damper plate 36, extend. In this way meshing means, optionally defining a clearance, are provided between the damper plate 36 and the disc 43, so that the disc 43 is mounted on the second mass 11B, for rotation with it after any clearance has been taken up.

The ring 47 has lugs at its inner periphery, penetrating into grooves in the hub 25, for mounting the said ring on the hub for rotation with it.

During the relative movement between the two coaxial parts 11A, 11B, the springs 38', 38" are compressed, and the liners 44 are caused to rub with friction against the plate 16 and the ring 47 respectively.

The foregoing arrangements are well known in themselves, and will not be described here in any greater detail.

In accordance with the invention, the friction means 13 further include at least one thin plate element 50 which, being carried by one of the coaxial parts 11A, 11B, extends obliquely with respect to the axis A of the assembly and bears, through its edge 51, against the other one of the coaxial parts 11A, 11B, and which is acted on, on its surface 52 facing away from the axis A of the assembly, by a modulating member 53 which is responsive to centrifugal force.

In this example the thin plate element 50 extends in a continuous circle around the axis A of the assembly, so as to form a ring.

Preferably, it is located both radially and circumferentially on the coaxial part 11A, 11B that carries it.

In this example, the thin plate element 50 is carried by the secondary coaxial part 11B, and more precisely, by the damper plate 36 which is part of the latter, while it bears through its edge on the primary coaxial part 11A, and more precisely on the plate 16 of the latter.

In the present example the thin plate element 50 is part of a member 55 which has the general form of a slightly open annular cage, and inside which the modulating member 53 is mounted.

The said member 55 extends radially from one to the other of two cylindrical surfaces 56, 57 of the damper plate 36, and therefore of the secondary coaxial part 11B, between the openings 39 of the damper plate 36 and the inner periphery of the latter.

Besides the thin plate element 50, the member 55 comprises in this example an integral portion 60, which extends axially away from the inner periphery of the thin plate element 50 and up to an engagement on the cylindrical surface 56 of the damper plate 36, a portion 61 which extends transversely in contact with the damper plate 36, and a portion 62 which extends generally axially in contact with the cylindrical surface 57, which in this example is inclined, of the damper plate 36.

The surface 57 assists the axial retention of the member 55.

The member 55, and therefore the thin plate element 50, is located radially on the damper plate 36 by means of the portions 60, 62.

They may be located circumferentially on the latter through the portion 61 in a positive manner, for example by adhesive bonding. However, friction between the edge 61 and the damper plate 36 is usually enough by itself to retain the member 55, and therefore the thin plate element 50, circumferentially with respect to the damper plate 36.

In this example, the edge 51 of the thin plate element 50, through which it bears on the plate 16 of the primary coaxial part 11A, is chamfered in an inclined surface 63.

The consequence of the foregoing is that there is a thin plate element 50 on at least one side of the damper plate 36.

In accordance with the invention, the thin plate element 50 sealingly closes, at the level at which it is located, the chamber 15, which can therefore contain grease for lubrication of the resilient members 38.

In this example there is a thin plate element 50 on either side of the damper plate 36, and the corresponding members 55 are arranged back to back on either side of the latter.

One of the thin plate elements 50 thus lies between the damper plate 36 and the plate 16 of the primary coaxial part 11 A, while the other one of the thin plate elements 50 lies between the damper plate 36 and the cover plate 19 associated with it.

The members 55, and therefore the thin plate elements 50, may be made of a synthetic material or metal for example.

It will be appreciated that it is easy to make a subassembly comprising the members 55, having the thin plate elements 50, and the damper plate 36. Each of the members 55 is, in this connection, snap fitted into a recess defined in the damper plate by the elements 61, 56, 57.

In this example, the modulating member 53 associated with a thin plate element 50 comprises a spring 64 which extends in an annular manner around the axis A of the assembly, and which is elastically deformable in the radial direction.

For example, and as shown, this spring is of the coil spring type.

If desired, and as is indicated in phantom lines in FIG. 3, it may be loaded locally with at least one weight 65.

This weight 65 may for example be in the form of a sleeve, which is engaged through its central bore on the spring 64.

A plurality of weights 65 are preferably provided, being spaced apart at regular intervals on a circle around the axis A of the assembly.

In the rest condition, the spring 64 is under precompression, and the forces applied to it tend to reduce its radius in the manner indicated by the arrow F1 in FIG. 2.

Accordingly, it urges the thin plate element 50 firmly against the plate 16 of the primary coaxial part 11 A, as indicated by the arrow F2 in FIG. 2.

In operation, and under the effect of centrifugal force, the radius of the spring 64 tends to increase, which releases the thin plate element 50 by a corresponding amount.

The friction torque set up by the latter tends to diminish accordingly.

In other words, this friction torque has a maximum value in the rest condition, and therefore on starting and stopping of the engine.

The present invention is of course not limited to the embodiment described and shown, but embraces all practical modifications.

In particular, instead of extending circumferentially as a continuous ring, the thin plate element which is provided in accordance with the invention may be arranged only locally, the arrangement being for example as though the corresponding ring were divided circumferentially into one or more thin plate elements.

In addition, the field in which the invention is applicable is not limited to that of double damped flywheels alone, but, on the contrary, it extends to any other kind of torsion damping device whatsoever, and for example to those with which at least some clutches are equipped.

The hub 25 can of course be integral with the plate 16, with the abutment shoulder for the ring 46 then being defined, for example, by a circlip.

The studs 28 may be fitted radially outside the bearing 32. In that case, it is necessary to provide passages in the plate 21, alternating with the studs 37 for example, to give access to the heads of the studs 28.

The cover plate 19 may be sealingly attached by welding or seaming on the flange 18, and may define, with the plate 16, an annular channel for the coil springs 38', 38".

I claim:

1. A torsion damping device of the kind comprising two coaxial parts (11A, 11B), one primary, one secondary, which are mounted for rotation of one with respect to the other against the action of circumferentially acting resilient means (12) and friction means (13, 13'), wherein the friction means (13, 13') comprise at least one thin plate element (50) which, being carried by one of the coaxial parts (11A, 11B), extends obliquely with respect to the axis (A) of the assembly and bears through its edge (51) against the other one of the coaxial parts (11A, 11B), and which is subjected, on its surface (52) that faces away from the axis (A) of the assembly, to the action of a modulating member (53) which is responsive to centrifugal force and the modulating member (53) comprises a spring (64) which extends in an annular manner around the axis (A) of the assembly, and which is elastically deformable in the radial direction.

2. A torsion damping device according to claim 1, wherein the thin plate element (50) is located both radially and circumferentially on the coaxial part (11A, 11B) that carries it.

3. A torsion damping device according to claim 1, wherein the edge (51) of the thin plate element (50) through which it bears on one of said coaxial part (11A, 11B) is chamfered with an inclined surface (63).

4. A torsion damping device according to claim 1, wherein the spring (64) is of the coil spring type.

5. A torsion damping device according to claim 1, wherein the spring (64) is loaded with at least one weight (65).

6. A torsion damping device according to claim 1, wherein in the rest condition, the spring (64) is under precompression, and the forces to which it is subjected tend to reduce its radius.

7. A torsion damping device according to claim 1, wherein the thin plate element (50) extends continuously as a ring, in a circle around the axis (A) of the assembly.

8. A torsion damping device according to claim 1, wherein the thin plate element is part of a member (55) having the general form of an annular cage, in which the modulating member (53) is disposed.

9. A torsion damping device according to claim 8, wherein the member (55) extends radially from one of two cylindrical surfaces (56, 57) of the corresponding coaxial part (11B) to the other.

10. A torsion damping device according to claim 7, characterised in that, with one of the coaxial parts (11A, 11B) defining a chamber (15) in which the resilient means (12) are disposed, while the other one of the coaxial parts (11 A, 11 B) comprises a damper plate (36) which, for engagement of the said resilient means (12), extends radially into the said chamber (15), there is a thin plate element (50) on at least one side of the damper plate (36), and the said thin plate element (50) sealingly closes the interior of the chamber (15) at the level of that plate element.

11. A torsion damping device according to claim 10, wherein there is a thin plate element (50) on each side of the damper plate (36).

12. A torsion damping device according to claim 11, characterised in that, with each of the thin plate elements (50) being part of a respective member (55) in the form of an annular cage, the said members (55) are arranged in back to back relationship on either side of the damper plate (36).

13. A torsion damping device according to claim 11, characterised in that the coaxial part (11A) that defines a chamber (15) comprises a housing (14) which comprises a plate (16) having a flange (18) at its outer periphery, together with a cover plate (19) fixed to the housing (14), and one thin plate element (50) extends between the damper plate (36) and the plate (16), while another one extends between the damper plate (36) and the cover plate (19).

* * * * *